United States Patent
Sacchetti et al.

(10) Patent No.: US 7,223,711 B2
(45) Date of Patent: May 29, 2007

(54) PRE-POLYMERIZED CATALYST COMPONENTS FOR THE POLYMERIZATION OF OLEFINS

(75) Inventors: Mario Sacchetti, Ferrara (IT); Diego Brita, Ferrara (IT); Gianni Collina, Cassaana (IT)

(73) Assignee: Basell Polyolefine GmbH, Wesseling (DE)

( * ) Notice: Subject to any disclaimer, the term of this patent is extended or adjusted under 35 U.S.C. 154(b) by 800 days.

(21) Appl. No.: 10/030,466

(22) PCT Filed: May 7, 2001

(86) PCT No.: PCT/EP01/05254

§ 371 (c)(1),
(2), (4) Date: Jan. 8, 2002

(87) PCT Pub. No.: WO01/85803

PCT Pub. Date: Nov. 15, 2001

(65) Prior Publication Data

US 2003/0040427 A1    Feb. 27, 2003

(30) Foreign Application Priority Data

May 12, 2000 (EP) .................................. 00201702

(51) Int. Cl.
*B01J 31/06* (2006.01)
(52) U.S. Cl. ....................................................... 502/103
(58) Field of Classification Search .................. 502/103
See application file for complete search history.

(56) References Cited

U.S. PATENT DOCUMENTS

| 4,220,554 | A | | 9/1980 | Scatá et al. | ............. | 252/429 B |
|---|---|---|---|---|---|---|
| 4,298,718 | A | | 11/1981 | Mayr et al. | .................. | 526/125 |
| 4,325,837 | A | | 4/1982 | Capshew et al. | ....... | 252/429 B |
| 4,399,054 | A | | 8/1983 | Ferraris et al. | ......... | 252/429 B |
| 4,495,338 | A | | 1/1985 | Mayr et al. | .................. | 426/125 |
| 5,352,749 | A | | 10/1994 | DeChellis et al. | ............ | 526/68 |
| 5,556,820 | A | | 9/1996 | Funabashi et al. | .......... | 502/111 |
| 5,641,721 | A | * | 6/1997 | Pentti et al. | ................. | 502/103 |
| 6,399,533 | B2 | * | 6/2002 | Sacchetti et al. | ........... | 502/125 |
| 6,413,901 | B1 | * | 7/2002 | Moman et al. | .............. | 502/132 |
| 6,423,660 | B1 | * | 7/2002 | Albizzati et al. | ........... | 502/109 |
| 6,468,938 | B1 | * | 10/2002 | Govoni et al. | .............. | 502/126 |

FOREIGN PATENT DOCUMENTS

| EP | 0089691 | 9/1983 |
|---|---|---|
| EP | 0241947 | 10/1987 |
| EP | 0395083 | 10/1990 |
| EP | 0522423 | 1/1993 |
| EP | 0641807 | 3/1995 |
| EP | 0695313 | 2/1996 |
| EP | 0735056 | 10/1996 |
| WO | 9428032 | 12/1994 |
| WO | 9844009 | 10/1998 |

* cited by examiner

*Primary Examiner*—David Sample
(74) *Attorney, Agent, or Firm*—Jarrod N Raphael

(57) ABSTRACT

Catalyst components for the preparation of ethylene (co) polymers capable to produce polymers with high bulk density, to avoid the problems of formation of fines and that have a high activity are provided. Said catalyst components are characterized by comprising a non-stereospecific solid catalyst component, comprising a titanium compound and a magnesium dihalide, which is pre-polymerized with an alpha olefin $CH_2=CHR^1$ wherein R is a C1–C8 alkyl group, to such an extent that the amount of the $\alpha$-olefin pre-polymer is up to 100 g per g of said solid catalyst component.

19 Claims, No Drawings

PRE-POLYMERIZED CATALYST COMPONENTS FOR THE POLYMERIZATION OF OLEFINS

This application is the U.S. national phase of International Application PCT/EP01/05254 filed May 7, 2001.

The present invention relates to catalyst components for the preparation of ethylene (co)polymers by using gas-phase, slurry or bulk (co)polymerization processes.

High-yield catalyst components for the polymerization of olefins and in particular for ethylene are known in the art. They are generally obtained by supporting, on a magnesium dihalide, a titanium compound normally chosen from titanium halides alkoxide and haloalcoholates. Said catalyst components are then used together with an aluminum alkyl compound in the polymerization of ethylene. This kind of catalyst components, and the catalysts obtained therefrom, are largely used in the plants for the (co)polymerization of ethylene both operating in liquid phase (slurry or bulk) and in gas-phase. However, the use of the catalyst components as such is not completely satisfactory. Indeed, due to the high reactivity of the ethylene, the kinetic of the polymerization reaction is very high. As a consequence, the catalyst is subject to a very strong tension during the initial stage of polymerization which can cause the uncontrolled breakage of the catalyst itself. This event is the cause of the formation of fine particles of polymer, which, in turn, leads to low bulk density of the polymer and to operating process difficulties.

In the attempt to solve these problems, the catalyst is pre-polymerized under controlled conditions, so as to obtain pre-polymerized catalysts purposed to have good morphology. In fact, it is believed that after the pre-polymerization, the catalysts increase their resistance in such a way that the tendency to break under polymerization conditions is decreased. As a consequence, also the formation of fine particles would be reduced. In addition, it is hoped that also the bulk density of the final polymers is improved. In principle the catalyst component could be pre-polymerized with any olefin, however, in practice, the non-stereospecific catalysts are always pre-polymerized with ethylene. In fact, in the art it is believed that if prochiral olefins like propylene would be pre-polymerized with non-stereospecific catalyst, the amorphous polymer produced would negatively affect the performance of the catalysts both in terms of activity and morphological properties. The pre-polymerization with ethylene of a non-stereospecific catalyst however does not fully solve the problems mentioned before. In U.S. Pat. No. 4,325,837 for example, as it is apparent from table 14A and 14B, the use of a non-stereospecific catalyst pre-polymerized with ethylene to an extent of lower than 50% b.w., based on the weight of the total pre-polymerized catalyst, is not always satisfactory because the yields and the morphological properties of the polymer produced with the pre-polymerized catalyst are in certain cases lower than that of the non-pre-polymerized one. In the same patent it is said (column 37 lines 57-60) that the use of a pre-polymerized catalyst is of no advantage with respect to the non pre-polymerized one. In addition to these problems, it must be noted that in view of the very high reactivity of ethylene the pre-polymerization with this monomer can give some difficulties in keeping the mild conditions that are generally used in the pre-polymerization in order to reach the desired properties of the catalyst.

In view of this situation it has now surprisingly been found that by carrying out the pre-polymerization with prochiral monomers it is possible to obtain a catalyst for the polymerization of olefins which is capable to produce polymers with high bulk density, to avoid the problems of formation of fines and that has an activity which is higher than that of the original non pre-polymerized catalyst.

It is therefore an object of the present invention a pre-polymerized catalyst component for the polymerization of ethylene, optionally in mixtures with olefins $CH_2=CHR$, wherein R is a C1-C12 alkyl group, characterized by comprising a non-stereospecific solid catalyst component, comprising Ti, Mg and a halogen, which is pre-polymerized with an alpha olefin $CH_2=CHR^1$ wherein $R^1$ is a C1-C8 alkyl group, to such an extent that the amount of the α-olefin pre-polymer is up to 100 g per g of said solid catalyst component.

According to the present invention the term "non-stereospecific solid catalyst component" means a solid catalyst component that gives, under the standard polymerization conditions described below, a propylene homopolymer having an insolubility in xylene at 25° C. lower than 90% and preferably lower than 85%.

Preferably, the amount of the α-olefin polymer is less than 15 g and more preferably said amount is less than 5 g per g of solid catalyst component. In the preferred embodiment said amount of the α-olefin polymer is from 0.8 to 4 g per g of solid catalyst component.

Preferably the catalyst component of the present invention comprises a titanium compound and a magnesium dihalide. The magnesium halides, preferably $MgCl_2$, in active form used as a support for Ziegler-Natta catalysts, are widely known from the patent literature. Patents U.S. Pat. Nos. 4,298,718 and 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is broadened to form a halo.

The preferred titanium compounds used in the catalyst component of the present invention are those of formula $Ti(OR^{II})_{n-y}X_y$, where $R^{II}$ is a C1-C20 hydrocarbon group X is halogen, n is the valence of titanium and y is a number between 1 and n. Particularly preferred compounds are $TiCl_4$, $TiCl_3$ and Ti-tetraalcoholates or Ti-chloroalcoholates of formula $Ti(OR^{III})_a Cl_{n-a}$ where n is the valence of titanium, a is a number comprised between 1 and n, and $R^{III}$ is a C1-C8 alkyl or aryl group. Preferably $R^{III}$ is selected from n-butyl, isobutyl, 2-ethylhexyl, n-octyl and phenyl.

The titanium compound can be pre-formed, or it is produced in-situ by the reaction of a titanium tetrahalide, in particular $TiCl_4$, with alcohols $R^{II}OH$ or with titanium alkoxides having the formula $Ti(OR^{II})_4$ where $R^{II}$ has the meaning defined above.

In the alternative, the titanium tetralkoxides can be caused to react with halogenating compounds such as, for instance, $SiCl_4$, $AlCl_3$, chlorosilanes, Al-alkyl halides to form titanium haloalcoholates. In the latter case, the titanium valence is reduced and titanium haloalkoxides are formed wherein the titanium valence is lower than 4.

The preparation of the solid catalyst component can be carried out according to several methods. According to one of these methods, the magnesium dichloride in an anhydrous state and the titanium compound are milled together under conditions in which activation of the magnesium dichloride occurs. The so obtained product can be treated one or more times for example with an excess of $TiCl_4$ at a temperature between 80 and 135° C. This treatment is followed by washings with hydrocarbon solvents until chloride ions disappeared. According to a further method, the product obtained by co-milling the magnesium chloride in an anhydrous state and the titanium compound is treated with halogenated hydrocarbons such as 1,2-dichloroethane, chlorobenzene, dichloromethane etc. The treatment is carried out for a time between 1 and 4 hours and at temperature of from 40° C. to the boiling point of the halogenated hydrocarbon. The product obtained is then generally washed with inert hydrocarbon solvents such as hexane.

According to another method, magnesium dichloride is pre-activated according to well-known methods and then treated with an excess of $TiCl_4$ at a temperature of about 80 to 135° C. The treatment with $TiCl_4$ is repeated and the solid is washed with hexane in order to eliminate any non-reacted $TiCl_4$.

A further method comprises the reaction between magnesium alcoholates or chloroalcoholates (in particular chloroalcoholates prepared according to U.S. Pat. No. 4,220,554) and an excess of $TiCl_4$ at a temperature of about 80 to 120° C.

According to a preferred general method, the solid catalyst component can be prepared by reacting a titanium compound of formula $Ti(OR^{II})_{n-y}X_y$, where X, $R^{II}$, n, and y have the same meanings described above, with a magnesium chloride deriving from an adduct of formula $MgCl_2 \cdot pROH$, where p is a number between 0.1 and 6, preferably from 2 to 3.5, and R is a hydrocarbon radical having 1–18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100–130° C.). Then, the emulsion is quickly quenched, thereby causing the solidification of the adduct in form of spherical particles. The so obtained adduct can be directly reacted with the Ti compound or it can be previously subjected to thermally controlled dealcoholation (80–130° C.) so as to obtain an adduct in which the number of moles of alcohol is generally lower than 3 preferably between 0.1 and 2.5. The reaction with the Ti compound can be carried out for example by suspending the adduct (dealcoholated or as such) in cold $TiCl_4$ (generally 0° C.); the mixture is heated up to 80–130° C. and kept at this temperature for 0.5–2 hours. The treatment with $TiCl_4$ can be carried out one or more times.

The preparation of catalyst components in spherical form is described for example in European Patent Applications EP-A-395083 and WO98/44009.

According to a variation of the method described above the preparation of the solid catalyst components can comprise the following steps:
(a) reacting a compound $MgCl_2 \cdot mROH$, wherein $0.3 \leq m \leq 1.7$ and R is an alkyl, cycloalkyl or aryl radical having 1–12 carbon atoms, with a titanium compound of the formula $Ti(OR^{II})_b X_{y-b}$, in which b is comprised between 0 and 0.5, y is the valence of titanium, X is halogen and $R^{II}$ has the meaning given above;
(b) reacting the product obtained from (a) with an Al-alkyl compound and
(c) reacting the product obtained from (b) with a titanium compound of the formula
$Ti(OR^{II})_n X_{y-n}$, in which n, y, X and $R^{II}$ have the meanings explained above.

As mentioned above, the compound $MgCl_2 \cdot mROH$ can be prepared by thermal dealcoholation of adducts $MgCl_2 \cdot pEtOH$, having a higher alcohol content.

In the reaction of step (a) the molar ratio Ti/Mg is stoichiometric or higher; preferably this ratio in higher than 3. Still more preferably a large excess of titanium compound is used. Preferred titanium compounds are titanium tetrahalides, in particular $TiCl_4$.

In step (b) the product obtained from (a) is then reacted with an aluminum-alkyl compound. The aluminum alkyl compound is preferably selected from those of formula $R_z AlX_{3-z}$, in which R is a $C_1$–$C_{20}$ hydrocarbon group, z is an integer from 1 to 3 and X is halogen, preferably chlorine. Particularly preferred is the use of the trialkyl aluminum compounds such as for example triethylaluminum, triisobutylaluminum, tri-n-butylaluminum, tri-n-hexylaluminum, tri-n-octylaluminum and tris(2,4,4-trimethyl-pentyl)aluminum. Use of tris(2,4,4-trimethyl-pentyl)aluminum is especially preferred. It is also possible to use mixtures of trialkylaluminum compounds with alkylaluminum halides, alkylaluminum hydrides or alkylaluminum sesquichlorides, such as $AlEt_2Cl$ and $Al_2Et_3Cl_3$.

The reaction with the Al-alkyl compound with the product coming from (a) can be carried out in a hydrocarbon solvent at a temperature between −10° C. and 130° C. Preferably the reaction is carried out at a temperature between 40 and 110° C. The molar ratio between the Al-alkyl compound and the product coming from (a) is not particularly critical. Generally the Al-alkyl compound can be used in molar ratios with the alcohol originally contained in the compound (a) from 0.01 to 100.

In the third step, the solid product coming from (b) is further reacted with a titanium compound of the same formula given above. Preferably, the specific titanium compound and the reaction conditions are similar to those used in the step (a). The use of the catalyst components prepared by this method is preferred.

Moreover, it constitutes a preferred aspect of the invention also the use of catalyst components obtained by another variation of the general method described above and that comprises (a) the thermal dealcoholation of the adducts $MgCl_2 \cdot pEtOH$ until forming adducts in which the alcohol content is reduced to values lower than 2 and preferably comprised between 0.3 and 1.5 mols per mol of magnesium dihalide, (b) the treatment of said thermally dealcoholated adduct with chemical reagents capable of reacting with the OH groups of the alcohol and of further dealcoholating the adduct until the content is reduced to values which are generally lower than 0.5 mols and (c) the reaction of said chemically dealcoholated adduct with a Ti compound of formula $Ti(OR^{II})_{n-y}X_y$, where X, $R^{II}$, n, and y have the same meanings described above. The adducts can also be dealcoholated to a very great extent, by reducing the alcohol content down to values lower than 0.05 mols.

The treatment with the dealcoholating chemical agents is carried out by using an amount of such an agent which is large enough to react with the OH groups present in the alcohol contained in the adduct. Preferably, the treatment is carried out using a slight excess of said agent, which is then removed prior to the reaction of the titanium compound with the thus obtained support.

In the event that the chemical dealcoholation of the $MgCl_2 \cdot pROH$ adduct is carried out by using agents having a reducing activity, for instance an Al-alkyl compound such as Al-triethyl, the thus obtained compound, prior to the reaction with the titanium compound, can be treated with a deactivating agent, for instance $O_2$, in order to deactivate the Al-triethyl possibly present therefore avoiding the reduction of the titanium compound.

The treatment with deactivating agents is avoided when one wishes to at least partially reduce the titanium compound. If, on the other hand, one wishes to reduce the titanium compound to a very great extent, the process for preparing the catalyst component can advantageously comprise the use of reducing agents.

The solid catalyst components obtained according to the methods that comprise the use of $MgCl_2 \cdot pEtOH$ adducts generally show a surface area (by B.E.T. method) generally between 20 and 500 $m^2/g$ and preferably between 50 and 400 $m^2/g$, and a total porosity (by B.E.T. method) higher than 0.2 $cm^3/g$ preferably between 0.2 and 0.6 $cm^3/g$. The porosity (Hg method) due to pores with radius up to 10000 Å generally ranges from 0.3 to 1.5 $cm^3/g$, preferably from 0.45 to 1 $cm^3/g$.

As explained above, the pre-polymerized catalyst component can be obtained by pre-polymerizing the solid catalyst component together with the α-olefin. Said α-olefin is preferably selected from propylene, butene-1, hexene, 4-methyl-1-pentene, and octene-1. The use of propylene is particularly preferred.

The pre-polymerization is normally carried out in the presence of an Al-alkyl compound.

The alkyl-Al compound (B) is preferably chosen among the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$.

It has been found particularly advantageous to carry out said pre-polymerization using low amounts of alkyl-Al compound. In particular said amount could be such as to have an Al/Ti molar ratio from 0.001 to 50, preferably from 0.01 to 10 and more preferably from 0.05 to 2.5. The pre-polymerization can be carried out in liquid phase, (slurry or solution) or in gas-phase at temperatures generally lower than 50° C., preferably between −20 and 30° C. and more preferably between −10 and 20° C. Furthermore, it is preferably carried out in a liquid diluent in particular selected from liquid hydrocarbons. Among them, pentane, hexane and heptane are preferred.

As explained, the so obtained pre-polymerized catalyst components can be used in the (co)polymerization of ethylene, allowing to obtain high activity, polymers with high bulk density and very good morphology. In particular, the catalysts of the invention are endowed with features that render them particularly suitable for the liquid (bulk or slurry) and gas-phase polymerization processes which operate with a pre-polymerization step. In addition, since the catalysts have not aging problems they can be also pre-polymerized in a batch scale and then used in liquid or gas-phase olefin polymerization plants operating without a pre-polymerization line.

In particular, said ethylene (co)polymerization processes can be carried out in the presence of a catalyst comprising (A) the pre-polymerized catalyst component; and (B) an Al-alkyl compound of the type described above.

The above process is suitable for the preparation of wide range of polyethylene products. As an example, the following products can be prepared: high density ethylene polymers (HDPE, having a density higher than 0.940 $g/cm^3$), comprising ethylene homopolymers and copolymers of ethylene with α-olefins having 3–12 carbon atoms; linear low density polyethylenes (LLDPE, having a density lower than 0.940 $g/cm^3$) and very low density and ultra low density (VLDPE and ULDPE, having a density lower than 0.920 $g/cm^3$, to 0.880 $g/cm^3$) consisting of copolymers of ethylene with one or more α-olefins having from 3 to 12 carbon atoms, having a mole content of units derived from the ethylene higher than 80%;

The above described polymerization process can be carried out under the polymerization conditions generally known in the art. Accordingly, the polymerization is generally carried out at temperature of from 20to 120° C., preferably of from 40 to 80° C. In any of the polymerization processes used (liquid or gas-phase polymerization) the catalyst forming components (A) and (B) can be pre-contacted before adding them to the polymerization reactor. Said pre-contacting step can be carried out in the absence of polymerizable olefin or optionally in the presence of said olefin in an amount up to 3 g per g of solid catalyst component. The catalyst forming components can be contacted with a liquid inert hydrocarbon solvent such as propane, n-hexane, or n-heptane at a temperature below about 60° C. and preferably from about 0° C. to 30° C. for a time period of from 10 seconds to 60 minutes.

When a gas-phase polymerization process is used, it can be carried out according to known techniques operating in one or more reactors having a fluidized or mechanically agitated bed. Inert fluids such as nitrogen, or low hydrocarbons like propane, can be used both as a fluidization aid and in order to improve the thermal exchange within the reactors. In addition, also techniques increasing the removal of the reaction heat comprising the introduction of liquids, optionally in mixture with gas, into the reactors, can be used. Preferably the liquids are fresh or make-up monomers. Such techniques are disclosed for example in EP-A-89691, EP-A-241947, U.S. Pat. No. 5,352,749, WO94/28032 and EPA-695313.

The following examples are given in order better illustrate the invention without limiting it.

EXAMPLES

Characterization

General Procedure for the Standard Propylene Polymerization Test

A 4 liter steel autoclave equipped with a stirrer, pressure gauge, thermometer, catalyst feeding system, monomer feeding lines and thermostatting jacket, was used. The reactor was charged with 0.01 g of solid catalyst component and with TEAL, and cyclohexyl-methyl dimethoxy silane in such amounts to give an Al/Si molar ratio of 4. Moreover, 3.2 l of propylene, and 1.5 l of hydrogen were added. The system was heated to 70° C. over 10 min. under stirring, and maintained under these conditions for 120 min. At the end of the polymerization, the polymer was recovered by removing any non-reacted monomers and was dried under vacuum.

Determination of Melt Index

ASTM D 1238 condition "E"

ASTM D 1238 condition "P"

Determination of Xylene Insolubility 2.5 g of polymer were dissolved in 250 ml of o-xylene under stirring at 135° C. for 30 minutes, then the solution was cooled to 25° C. and after 30 minutes the insoluble polymer was filtered. The resulting solution was evaporated in nitrogen flow and the residue was dried and weighed to determine the percentage of soluble polymer and then, by difference the xylene insoluble fraction (%).

Example 1

Preparation of the Spherical Support (Adduct MgCl$_2$/EtOH)

A magnesium chloride and alcohol adduct was prepared following the method described in example 2 of U.S. Pat. No. 4,399,054, but working at 2000 RPM instead of 10000 RPM.

Preparation of Solid Catalyst Component

The spherical support, prepared according to the general method underwent a thermal treatment, under N$_2$ stream, over a temperature range of 50–150° C. until spherical particles having a residual alcohol content of about 25% were obtained.

Into a 72 l steel reactor provided with stirrer, 44 liters of TiCl$_4$ at 0° C. and whilst stirring 2200 g of the support were introduced. The whole was heated to 130° C. over 60 minutes and these conditions were maintained for a further 60 minutes. The stirring was interrupted and after 30 minutes the liquid phase was separated from the settled solid. Thereafter 4 washings with anhydrous hexane (about 22 liters) were performed two of which were carried out at 80° C. and two at room temperature.

Then, after the addition of 31 liters of anhydrous hexane, 11 liters of a solution of tris(2,4,4-trimethyl-pentyl)aluminum (Tioa) in hexane (100 g/l) were introduced at room temperature into the reactor and stirred for 30 minutes. The liquid phase was separated from the settled solid that was washed with 22 liters of hexane and with 22 liters of heptane (twice for each other) at room temperature.

Thereafter a further treatment with 44 liters of TiCl$_4$ was performed under the same condition used for the first one, and after 4 washings with anhydrous hexane, 2200 g of the spherical solid component were obtained. After drying under vacuum at about 50° C., the solid showed the following characteristics:

| | |
|---|---|
| Total titanium | 4.52% (by weight) |
| Ti$^{III}$ | 1.2% (by weight) |
| Al | 0.2% (by weight) |
| Mg | 20.0% (by weight) |
| Cl | 71.3% (by weight) |
| OEt | 0.5% (by weight) |
| porosity (B.E.T.) | 0.153 cm$^3$/g, |
| surface area (B.E.T.) | 50.6 m$^2$/g |

0.692 cm$^3$/g, 70% of which was due to pores with radius up to 0.1 µm.

Porosity due to pores with radius up to 1 µm: 0.552

Standard Propylene Polymerization Test

The above-described catalyst component was used in the polymerization of propylene according to the general procedure already described. It was produced a propylene homopolymer having an insolubility in xylene of 83.5%.

Preparation of the Pre-polmerized Catalyst

Into a 2.5 liters glass reactor provided with stirrer, 1.5 liters of hexane at Temperature of 20° C. and, whilst stirring, 40 g of the spherical catalyst were introduced. Keeping constant the internal temperature, 20 g of triisobutylaluminum (TIBA) in hexane (about 20 g/l) were (slowly) introduced at room temperature into the reactor. Then 40 g of propylene were carefully introduced into the reactor at the same temperature (with a propylene partial pressure of 40 mmHg). The consumption of propylene in the reactor was monitored and the polymerization was discontinued when a theoretical conversion of 1 g of polymer per g of catalyst was deemed to be reached. After 3 hexane washing at T=20° C. (50 g/l), we dried and analyzed the resulting pre-polymerized catalyst that contained 1.1 g of polypropylene per g of catalyst.

Ethylene Polymerization (HDPE)

Into a 10 liters stainless steel autoclave, degassed under N$_2$ stream at 70° C., 4 liters of anhydrous hexane, 0.03 g of pre-polymerized catalyst (containing 0.0135 g of catalyst) and 0.5 g of triisobutylaluminum (Tiba) were introduced. The whole was stirred, heated to 75° C. and thereafter 4 bar of H$_2$ and 7 bar of ethylene were fed. During the polymerization ethylene was fed to keep the pressure constant. After 2 hours the polymerization was discontinued and the collected polymer was dried at 70° C. under a nitrogen flow. The activity with respect to the catalyst contained in the pre-polymer was 9.95 kg/g cat/h. The MIE of the polymer was 0.33 and its poured bulk density was 0.363.

Example 2

Preparation of the Pre-polymerized Catalyst:

The same procedure described in Example 1 was used with the only difference that 40 g of triisobutylaluminum (TIBA) were used. The resulting pre-polymerized catalyst contained 1 g of polypropylene per g of catalyst.

Ethylene Polymerization (HDPE)

Into a 10 liters stainless steel autoclave, degassed under N$_2$ stream at 70° C., 4 liters of anhydrous hexane, 0.041 g of pre-polymerized catalyst component (containing 0.02 g of catalyst) and 0.3 g of triisobutylaluminum (Tiba) were introduced. The whole was stirred, heated to 75° C. and thereafter 4 bar of H$_2$ and 7 bar of ethylene were fed. During the polymerization ethylene was fed to keep the pressure constant. After hours the polymerization was discontinued and the collected polymer was dried at 70° C. under a nitrogen flow. The activity with respect to the catalyst contained in the pre-polymer was 9.65 kg/g cat/h. The poured bulk density of the polymer was 0.356

Comparison Example 3

Ethylene Polymerization (HDPE)

Into a 10 liters stainless steel autoclave, degassed under N$_2$ stream at 70° C., 4 liters of anhydrous hexane, 0.0195 g of the non pre-polymerized catalyst component prepared according to the procedure described in Example 1 and 0.3 g of triisobutylaluminum (Tiba) were introduced. The whole was stirred, heated to 75° C. and thereafter 4 bar of H$_2$ and 7 bar of ethylene were fed. During the polymerization ethylene was fed to keep the pressure constant. After hours the polymerization was discontinued and the collected polymer was dried at 70° C. under a nitrogen flow. The activity with respect to the catalyst used was 5.2 kg/g cat/h. The MIE of the polymer was 0.29 and its poured bulk density was 0.336.

Example 4

The spherical support containing about 3 mols of alcohol prepared according to the procedure described in Example 1 underwent a thermal treatment (under N$_2$ stream), over a temperature range of 50–150° C., until spherical particles having a residual alcohol content about 35% were obtained.

Into a 1600 litres steel reactor provided with stirrer, 350 litres of heptane and 70 Kg of the dealcoholated support were introduced.

The temperature was kept at 20° C. while 30.2 Kg of Teal (in heptane 100 g/l solution) were carefully added whilst stirring.

The reactor was heated at 40° C. in one hour and these conditions were maintained for a further 120 minutes. The stirring was interrupted and after 30 minutes, the liquid phase was siphoned from the reactor and the settled solid was washed three times with heptane. Then fresh heptane was added to obtain a concentration of 85 g/l.

In a different steel reactor (600 litres of volume), 128.8 Kg of $Ti(OBu)_4$ were introduced. Then, stirring at 300 rpm and keeping temperature constant at 20° C., 99.8 Kg of $SiCl_4$ in 105 minutes were added. The resulting solution was stirred for 20 minutes at that temperature.

The whole solution was added into the 1600 litres reactor in 90 minutes at 20° C.

The reactor was heated at 60° C. and the conditions were kept constant for 120 minutes. After this period, the stirring was stopped and after 30 minutes the liquid phase was separated from the solid.

The solid was washed eight times with fresh heptane at 70 g/l and then dried under vacuum.

The resulting catalyst component in spherical form exhibited the following characteristics:

| | |
|---|---|
| Total Titanium | 8.4% |
| Titanium 3+ | 8.1% |
| Chlorine | 48.6% |
| Magnesium | 11.9% |
| Aluminum | 0.2% |
| EtO-group | 7.5% |
| BuO-group | 16.6% |
| Porosity (mercury) | 0.520 $cm^3/g$ due to pores with a radius up to 10,000 Å. |

Standard Propylene Polymerization Test

The above-described catalyst component was used in the polymerization of propylene according to the general procedure already described. It was produced a propylene homopolymer having an insolubility in xylene of 81%.

Preparation of the Pre-polymerized Catalyst:

Into a 2.5 liters glass reactor provided with stirrer, 1.5 liters of hexane at 20° C. and whilst stirring 40 g of the catalyst prepared as above described were introduced. Keeping constant the internal temperature, 4 g of triethylaluminum (TEAL) in hexane (about 20 g/l) were slowly introduced at room temperature into the reactor. Then 160 g of propylene were carefully introduced into the reactor at the same temperature with a propylene partial pressure of 40 mnHg. The consumption of propylene in the reactor was monitored and the polymerization was discontinued when a theoretical conversion of 3 g of polymer per g of catalyst was deemed to be reached. After 3 hexane washing at a temperature of 20° C. (50 g/l), we dried and analyzed the resulting pre-polymerized catalyst that contained 3.2 g of polypropylene per g of catalyst.

Ethylene Polymerization (HDPE)

Into a 10 liters stainless steel autoclave, degassed under $N_2$ stream at 70° C., 4 liters of anhydrous hexane, 0.039 g of pre-polymerized catalyst (containing 0.0078 g of catalyst) and 0.3 g of triethylaluminum (TEAL) were introduced. The whole was stirred, heated to 75° C. and thereafter 4 bar of $H_2$ and 7 bar of ethylene were fed. During the polymerization ethylene was fed to keep the pressure constant. After 2 hours the polymerization was discontinued and the collected polymer was dried at 70° C. under a nitrogen flow. The activity with respect to the catalyst contained in the pre-polymer was 6.5 kg/g cat/h. The MWE of the polymer was 0.44 and its poured bulk density was 0.26.

Example 5

Preparation of the Pre-polymerized Catalyst:

The same procedure described in Example 4 was used with the only difference that 40 g of propylene were used. The resulting pre-polymerized catalyst contained 0.58 g of polypropylene per g of catalyst.

Ethylene Polymerization (HDPE)

Into a 10 liters stainless steel autoclave, degassed under $N_2$ stream at 70° C., 4 liters of anhydrous hexane, 0.024 g of pre-polymerized catalyst component (containing 0.015 g of catalyst) and 0.5 g of TEAL were introduced. The whole was stirred, heated to 75° C. and thereafter 4 bar of $H_2$ and 7 bar of ethylene were fed. During the polymerization ethylene was fed to keep the pressure constant. After hours the polymerization was discontinued and the collected polymer was dried at 70° C. under a nitrogen flow. The activity with respect to the catalyst contained in the pre-polymer was 5.1 kg/g cat/h. The MIE of the polymer was 0.71 and its poured bulk density was 0.25 g/cc.

Comparison Example 6

Ethylene Polymerization (HDPE)

Into a 10 liters stainless steel autoclave, degassed under $N_2$ stream at 70° C., 4 liters of anhydrous hexane, 0.016 g of the non pre-polymerized catalyst component prepared according to the procedure described in Example 4 and 0.3 g of TEAL were introduced. The whole was stirred, heated to 75° C. and thereafter 4 bar of $H_2$ and 7 bar of ethylene were fed. During the polymerization ethylene was fed to keep the pressure constant. After 2 hours the polymerization was discontinued and the collected polymer was dried at 70° C. under a nitrogen flow. The activity with respect to the catalyst used was 3.9 kg/g cat/h. The MIE of the polymer was 0.15 and its poured bulk density was 0.24 cc/g.

Example 7

Preparation of Solid Catalyst Component

The spherical support containing about 3 mols of alcohol prepared according to the procedure described in Example 1 underwent a thermal treatment (under $N_2$ stream), over a temperature range of 50–150° C., until spherical particles having a residual alcohol content about 15% were obtained. Into a 72 l steel reactor provided with stirrer, 44 liters of $TiCl_4$ at 0° C. and whilst stirring 4400 g of the support were introduced. The whole was heated to 100° C. over 60 minutes and these conditions were maintained for a further 60 minutes. The stirring was interrupted and after 30 minutes the liquid phase was separated from the settled solid. The treatment with $TiCl_4$ was carried out for additional two times with the same procedure but using at a temperature of 120 and 130° C. respectively. Thereafter 4 washings with anhydrous hexane (about 22 liters) were performed two of which were carried out at 80° C. and two at room temperature. The analysis carried out on the so obtained solid gave the following results:

| | |
|---|---|
| Total Titanium | 35% |
| Chlorine | 70.7% |
| Magnesium | 20% |
| EtO-group | 0.5% |

Standard Propylene Polymerization Test

The above-described catalyst component was used in the polymerization of propylene according to the general procedure already described. It was produced a propylene homopolymer having an insolubility in xylene of 78.5%.

Preparation of the Pre-polymerized Catalyst:

Into a 2.5 liters glass reactor provided with stirrer, 1.5 liters of hexane at temperature of 10° C. and whilst stirring 45 g of the spherical catalyst were introduced. Keeping constant the internal temperature, 15 g of tris(2,4,4-trimethyl-pentyl)aluminum (Tioa) in hexane (about 20 g/l) were (slowly) introduced at room temperature into the reactor. Then 40 g of propylene were carefully introduced into the reactor at the same temperature (with a propylene partial pressure of 40 mmHg). The consumption of propylene in the reactor was monitored and the polymerization was discontinued when a theoretical conversion of 1 g of polymer per g of catalyst was deemed to be reached. After 3 hexane washing at T=20° C. (50 g/l), we dried and analyzed the resulting pre-polymerized catalyst that contained 1 g of polypropylene per g of catalyst.

Ethylene polymerization (HDPE)

Into a 10 liters stainless steel autoclave, degassed under $N_2$ stream at 70° C., 4 liters of anhydrous hexane, 0.0226 g of pre-polymerized catalyst and 0.3 g of triisobutylaluminum (Tiba) were introduced. The whole was stirred, heated to 75° C. and thereafter 4 bar of $H_2$ and 7 bar of ethylene were fed. During the polymerization ethylene was fed to keep the pressure constant. After 2 hours the polymerization was discontinued and the collected polymer was dried at 70° C. under a nitrogen flow. The activity with respect to the catalyst contained in the pre-polymer was 27.1 kg/g cat. The MIP of the polymer was 0.3 and its poured bulk density was 0.313.

Comparison Example 8

Ethylene polymerization (HDPE)

Into a 10 liters stainless steel autoclave, degassed under $N_2$ stream at 70° C., 4 liters of anhydrous hexane, 0.0102 g of the non pre-polymerized catalyst component prepared according to the procedure described in Example 7 and 0.3 g of triisobutylaluminum (Tiba) were introduced. The whole was stirred, heated to 75° C. and thereafter 4 bar of $H_2$ and 7 bar of ethylene were fed. During the polymerization ethylene was fed to keep the pressure constant. After hours the polymerization was discontinued and the collected polymer was dried at 70° C. under a nitrogen flow. The activity with respect to the catalyst used was 17.1 kg/g cat. The MIP of the polymer was 0.29 and its poured bulk density was 0.31.

The invention claimed is:

1. A pre-polymerized catalyst component for the polymerization of ethylene optionally in mixtures with olefins $CH_2=CHR$, wherein R is a C1–C12 alkyl group, comprising a non-stereospecific solid catalyst component, comprising Ti, Mg and a halogen, which is pre-polymerized with an α-olefin $CH_2=CHR^I$ wherein $R^1$ is a C1–C8 alkyl group, and the amount of the α-olefin pre-polymer is less than 15 g per g of said solid catalyst component.

2. The pre-polymerized catalyst component according to claim 1 in which the amount of the α-olefin polymer is from 0.8 to 4 g per g of solid catalyst component.

3. The prepolymerized catalyst component according to claim 1 comprising a titanium compound and a magnesium dihalide.

4. The pre-polymerized catalyst component according to claim 1 in which the magnesium dihalide is magnesium dichloride in active form and the titanium compound is selected from the compounds of formula $Ti(OR)_{n-y}X_y$, where R is a C1–C20 hydrocarbon group, X is a halogen, n is the valence of titanium and y is a number between 1 and n.

5. The pre-polymerized catalyst component according to claim 4 in which the titanium compound is chosen from $TiCl_4$, $TiCl_3$ and Ti-tetralcoholates or Ti-chloroalcoholates of formula $Ti(OR^{II})_aCl_{n-a}$ where n is the valence of titanium, a is a number comprised between 1 and n, and $R^{II}$ is a C1–C8 alkyl or aryl group.

6. The pre-polymerized catalyst component according to claim 1 in which the solid catalyst component to be pre-polymerized has a surface area, by B.E.T. method, between 20 and 500 m$^2$/g, and a total porosity, by B.E.T. method, higher than 0.2 cm$^3$/g.

7. The pre-polymerized catalyst component according to claim 1 in which the solid catalyst component to be pre-polymerized has a porosity (Hg method) due to pores with radius up to 10000 Å, of from 0.3 to 1.5 cm$^3$/g.

8. The pre-polymerized catalyst component according to claim 1 in which the solid catalyst component is pre-polymerized with an α-olefin selected from propylene, butene-1, hexene, 4-methyl-1-pentene, and octene-1.

9. The pre-polymerized catalyst component according to claim 8 in which the α-olefin is propylene.

10. The pre-polymerized catalyst component according to claim 1 in which the solid catalyst component to be pre-polymerized is obtained by;
(a) reacting a compound $MgCl_2 \cdot mROH$, wherein $0.3 \leq m \leq 1.7$ and R is an alkyl, cycloalkyl or aryl radical having 1–12 carbon atoms, with a titanium compound of the formula $Ti(OR^{II})_bX_{y-b}$, in which b is comprised between 0 and 0.5, y is the valence of titanium, X is a halogen and $R^{II}$ is a C1–C20 hydrocarbon group;
(b) reacting the product obtained from (a) with an Al-alkyl compound; and
(c) reacting the product obtained from (b) with a titanium compound of the formula $Ti(OR^{II})_nX_{y-n}$, in which $R^{II}$ is a C1–C20 hydrocarbon group, X is a halogen, n is the valence of titanium, and y is a number between 1 and n.

11. The pre-polymerized catalyst component according to claim 1 in which the solid catalyst component to be pre-polymerized is obtained by:
(a) thermally dealcoholating adducts $MgCl_2 \cdot pEtOH$, where p is a number between 2 to 3.5, until forming adducts in which the alcohol content is reduced to values lower than 2 mols per mol of magnesium dihalide;
(b) treating the thermally dealcoholated adduct of step (a) with chemical reagents capable of reacting with the OH groups of the alcohol to dealcoholate the adduct until the alcohol content is reduced to values which are lower than 0.5 mols; and (c) reacting the chemically dealcoholated adduct of step (b) with a Ti compound of formula $Ti(OR^{II})_{n-y}X_y$, where $R^{II}$ is a C1–C20 hydrocarbon group, X is a halogen, n is the valence of titanium and y is a number between 1 and n.

12. The pre-polymerized catalyst component according to claim 1 in which said pre-polymerization is carried out using amounts of an alkyl-Al compound such as to have an Al/Ti molar ratio from 0.001 to 50.

13. The pre-polymerized catalyst component according to claim 12 in which the Al-alkyl compound is a trialkyl aluminum compound.

14. The pre-polymerized catalyst component according to claim 13 in which the trialkyl aluminum compound is chosen from triethylaluminum, triisobutylaluminum, tri-n-butylaluminum, tri-n-hexylaluminum, and tri-n-octylaluminum.

15. A process for the (co)polymerization of ethylene characterized in that it is carried out in the presence of a catalyst comprising (A) a pre-polymerized catalyst component comprising a non-stereospecific solid catalyst component, comprising Ti, Mg and a halogen, which is pre-polymerized with an α-olefin $CH_2$=$CHR^1$ wherein $R^1$ is a C1–C8 alkyl group, and the amount of the α-olefin pre-polymer is less than 15 g per g of said solid catalyst component; and (B) an Al-alkyl compound.

16. The process according to claim 15 in which ethylene is copolymerized with olefins $CH_2$=CHR, wherein R is a C1–C12 alkyl group.

17. The process according to claim 16 in which the olefin is chosen from propylene, butene-1, hexene-1 octene-1 and 4-methyl-1-pentene.

18. The pre-polymerized catalyst component according to claim 11, wherein in step (a) the alcohol content is reduced to values of from 1.5 to 0.3 mols per mol of magnesium dihalide.

19. The pre-polymerized catalyst component according to claim 12, wherein the Al/Ti molar ratio is from 0.01 to 10.

* * * * *